May 22, 1928.
J. H. HAMMOND, JR
1,670,354
DRIFT CALCULATOR
Filed Nov. 20, 1920
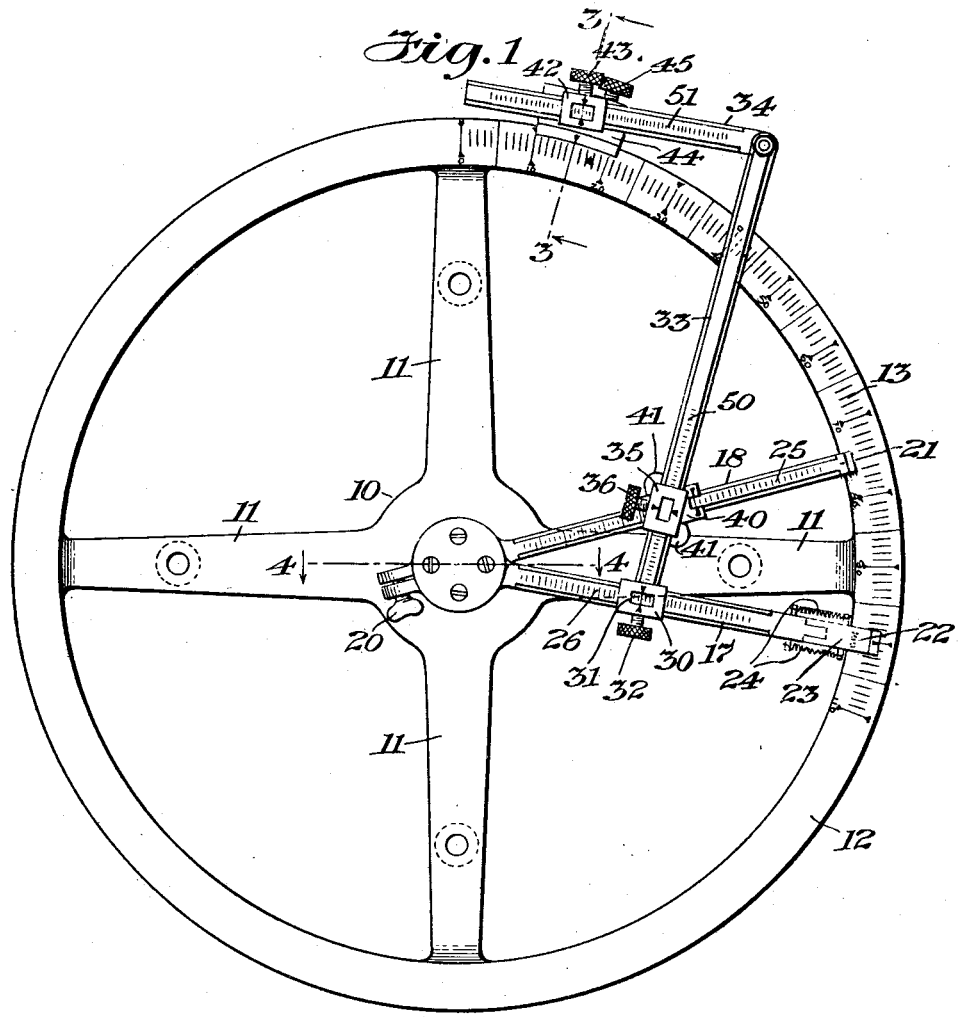
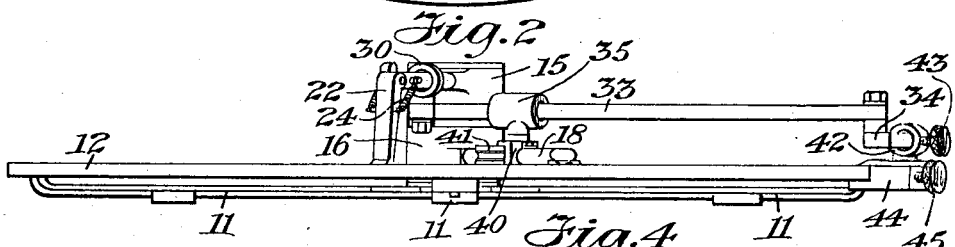
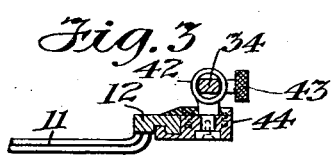
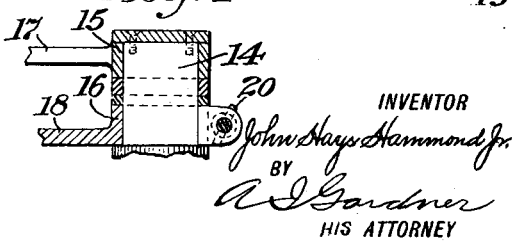
INVENTOR
John Hays Hammond Jr.
BY
A. J. Gardner
HIS ATTORNEY Patented May 22, 1928.

1,670,354

UNITED STATES PATENT OFFICE.

JOHN HAYS HAMMOND, JR., OF GLOUCESTER, MASSACHUSETTS.

DRIFT CALCULATOR.

Application filed November 20, 1920. Serial No. 425,434.

Some of the objects of the present invention are to provide an instrument for setting the course of a vessel with correction for tidal currents; to provide an instrument operating, where the speed of a vessel is known and the speed and direction of the tidal current at the point where the vessel is navigated is also known, to indicate a course compensating for the tidal current; and to provide other improvements as will hereinafter appear.

In the accompanying drawings, Fig. 1 represents a plan of a drift calculator embodying one form of the present invention; Fig. 2 represents a side elevation of the same; Fig. 3 represents a sectional detail on line 3—3 of Fig. 1; and Fig. 4 represents a section on line 4—4 of Fig. 1.

Referring to the drawings one form of the present system comprises a frame 10, preferably of spider formation, having arms 11 extending radially and fixed at their outer extremities to a ring 12, one face of which is provided with a circular scale 13 graduated in degrees or points of the compass.

For the purpose of setting a course from scale 13, the frame 10 is provided with an axially disposed vertical fixed stud 14 which is arranged to receive two hubs 15 and 16 one above the other, the former 15 being rigidly secured to a radially disposed arm 17 and the latter 16 being rigidly secured to a second radially disposed arm 18. The sleeve 16 is preferably split to form a clamping means operated by a wing bolt 20 whereby the arm 18 can be set in a predetermined position with respect to the scale 13. Both the arms 18 and 17 terminate respectively in index pointers 21 and 22 arranged in juxtaposed relation to the scale 13, the pointer 22 being upon a finger 23 pivoted to the arm 17 but is held in normal position by suitable springs 24. This construction permits the finger 23 to be lifted in case the arm 18 or other parts are required to swing under the arm 17.

The arm 18 is provided with a scale 25 graduated to give the actual or ground speed of the vessel, while the arm 17 is provided with a scale 26 graduated to give the speed of the vessel in knots with reference to the water.

The arm 17 carries a slider 30 having a sight opening 31 and being arranged to be clamped in any position upon the arm 17 by means of a thumb-screw 32. The slider 30 has an arm 33 pivoted to it to swing laterally outward across the frame 10 parallel to the plane of the ring 12 and terminates in a pivotal connection with an arm 34 which extends substantially tangent to and parallel to the plane of the ring 12. The arm 33 carries a movable slider 35, which can be fixed in any selected position by a thumb-screw 36, and has pivotal connection with a slider 40 arranged to slide upon the arm 18 and provided with rollers 41 to facilitate the sliding action.

The arm 34 carries a slider 42 having provision in the form of a thumb-screw 43 for clamping it to the arm 34, said slider 42 having pivotal connection with a member 44 which is mounted to ride upon the ring 12 where it may be clamped in any desired position by a thumb-screw 45.

The arm 33 is provided with a scale 50 graduated to give the speed of the tide in knots, and the arm 34 is provided with a scale 51 graduated to give the speed of the vessel in knots with reference to the water.

In the operation of the system, the speed of the boat with reference to the water is first determined, either by the revolutions of the engine, or by a log line, and the speed and direction of the tide at that point is determined from suitable charts. Assuming for example that the direction to be traveled is 15 degrees north of east, the arm 18 is set in its position, 75° on scale 13, and clamped there by means of the wing bolt 20. The member 44 is now moved and clamped upon the ring 12 in a position indicated by the scale 13 corresponding to the direction of the tide, here taken as 15 degrees to the east of north. The sliders 30 and 42 are then moved to positions corresponding to the speed of the vessel with reference to the water, this being taken, for example, as 16 knots, while the slider 35 is moved to a position corresponding to the speed of the tide, here taken as 8 knots. The shifting of the several sliders causes the arm 17 to take a position determined by the triangle formed by the arms 17, 18 and 33, which in the present case is 10 degrees south of east, (100° on scale 13). This is the course to which the vessel must be headed in order to have it follow the direction set by arm 18, which is the desired direction of navigation.

It will be noted that when the various parts have been adjusted in the manner described the arm 33 is disposed parallel to a radius of the base scale or ring 12 passing through the point on the base or compass scale on which the slide 44 is set. The arms 34 and 17 are also parallel and the portions of the scales on these arms indicated by the slides thereon are equal in length since these scales both relate to the speed of the vessel in knots, with reference to the water.

While but one of the many forms of the present invention has been here shown, it is to be understood that the invention is not limited to any specific construction but might be applied in various forms without departing from the spirit of the invention or the scope of the appended claims.

Having now fully described my invention, what I claim and desire to secure by Letters Patent is:—

1. In a drift calculator, a base member graduated to points of the compass, a scale movable relative to the base member and graduated to indicate the ground speed of a vessel, and arranged to be set by said compass scale to indicate a predetermined course, a member arranged to be set on said compass scale in a position corresponding to the compass direction of drift of the natural medium in which the vessel is supported, and means, including a scale graduated to indicate the actual speed of a vessel with reference to said medium and co-operating with both scales and said member, for indicating the course to be followed to compensate for the drift of the medium.

2. In a drift calculator, a base scale graduated to points of the compass, a scale movable relative to said base scale and graduated to indicate the ground speed of a vessel and arranged to be set by said compass scale to indicate a predetermined course, a member arranged to be set on said compass scale in a position corresponding to the compass direction of drift of the natural medium in which the vessel is supported, a scale graduated to indicate the actual speed of the vessel with reference to the said medium and adjustably mounted on said member, a scale graduated to indicate the speed of the current drift secured to said member scale and adjustably mounted upon said course indicating scale, and means cooperating with said current drift speed scale and said base scale for indicating the course to be followed to compensate for the drift of the medium.

3. In a drift calculator, a base scale graduated to points of the compass, a scale movable relative to said base scale and graduated to indicate the ground speed of the vessel and arranged to be set by said compass scale to indicate a predetermined course, a member arranged to be set on said compass scale in a position corresponding to the compass direction of an extraneous current, a scale graduated to indicate the actual speed of the vessel with reference to the medium in which the vessel is navigating and adjustably mounted on said member, a scale graduated to indicate the speed of said extraneous current secured to said member scale and adjustably mounted on said course indicating scale, and means co-operating with said current speed scale and said base scale for indicating the course to be followed to compensate for the current.

4. In a drift calculator, a base member having a compass scale, an arm adjustable on said scale and graduated to indicate the ground speed of a ship, means for setting said arm on the compass scale, a slide on said compass scale adapted to be set to indicate the direction of an extraneous current, a member adapted to indicate the course to be followed to compensate for the current and means co-operating with said slide and with the speed scale on said arm for moving said member to a position on the compass scale to indicate the course to be followed by the ship.

5. In a drift calculator, a base member having a compass scale, an arm adjustable on said scale and graduated to indicate the ground speed of a ship, means for setting said arm on the compass scale, a slide on said compass scale adapted to be set to indicate the direction of an extraneous current, a member adapted to indicate the course to be followed to compensate for the current and means connecting and co-operating with said slide and with the speed scale on said arm for moving said member to a position on the compass scale to indicate the course to be followed by the ship.

6. In a drift calculator, a base member having a compass scale, an arm adjustable on said scale and graduated to indicate the ground speed of a ship, a slide on said arm for indicating the ground speed of the ship, means for setting said arm on the compass scale, a slide on said compass scale adapted to be set to indicate the direction of an extraneous current, a member adapted to indicate the course to be followed to compensate for the current and means co-operating with said slide on the compass scale and with the slide on the ground speed scale on said arm for moving said member to a position on the compass scale to indicate the course to be followed by the ship.

7. In a drift calculator, a base member having a compass scale, an arm adjustable on said scale and graduated to indicate the ground speed of a ship, a slide on said arm for indicating the ground speed of the ship, means for setting said arm on the compass scale, a slide on said compass scale adapted to be set to indicate the direction of an extraneous current, a member adapted to indicate the course to be followed to compensate for the current and means co-operating with said slide on the compass scale and with the slide on the ground speed scale on said arm and slidably engaging said member for moving said member to a position on the compass scale to indicate the course to be followed by the ship.

8. In a drift calculator, a base member having a compass scale, an arm adjustable on said scale and adapted to be set thereon to indicate the direction of the course to be traveled, a second arm adjustable on said compass scale to indicate the course to compensate for an extraneous current, and means connected to said arms and adjustable in accordance with the ground speed of the ship, direction of an extraneous current, the speed of said current, and the speed of the ship with reference to the medium in which the ship is navigating, to move said second arm to a position indicating the compensated course to be followed by the ship.

9. A navigation instrument including a fixed base member, a graduated rotatable member mounted on said base member, for designating the course to be pursued, a second member rotatable concentrically with said first named member for indicating a desired course, a member adjustable along the perimeter of the base member and about the center of said base member as an axis for indicating the trend of the natural medium through which the course lies, a graduated bar slidably secured on said last named member arranged to be set according to the rate of speed to be maintained, a second graduated bar pivotally secured to the first named bar, and slidably mounted on said rotatable bars for varying the angular deviation of said members with respect to each other according to the trend and rate of flow of the natural medium.

In testimony whereof I hereunto set my hand at New York, county of New York, State of New York, the 5th day of October, 1920.

JOHN HAYS HAMMOND, Jr.